Jan. 15, 1924. 1,481,011
B. P. JOYCE
FLOATING PISTON
Filed May 7, 1923
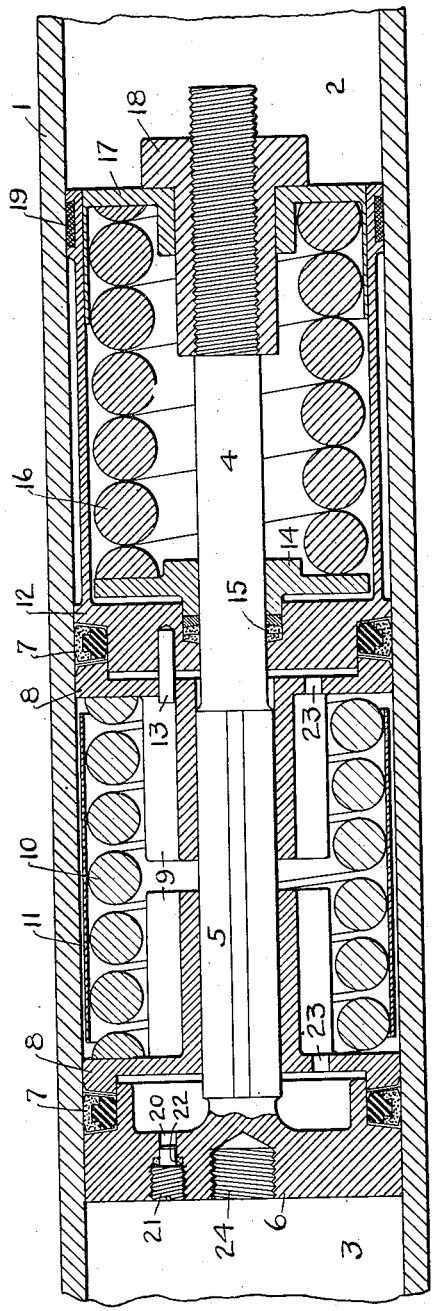
Inventor
BRYAN P. JOYCE.
By W. N. Roach.
Attorney Patented Jan. 15, 1924.

1,481,011

UNITED STATES PATENT OFFICE.

BRYAN P. JOYCE, OF DAVENPORT, IOWA.

FLOATING PISTON.

Application filed May 7, 1923. Serial No. 637,242.

*To all whom it may concern:*

Be it known that I, BRYAN P. JOYCE, a citizen of the United States, and a resident of Davenport, county of Scott, and State of Iowa, have invented an Improvement in Floating Pistons, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a floating piston intended, primarily, for use with hydropneumatic recoil systems.

The main object of the invention is the provision of a piston having a grease seal chamber and means for regulating the pressure in the grease seal chamber and consequently the pressure exerted upon the packing of the piston.

A still further object of the invention is the provision of a simple and efficient floating piston.

I gain the desired objects, broadly, by providing a stem upon which the parts are assembled in such a manner as to provide the customary grease chamber inclosed by a ring of packing at each end, the required packing pressure against the walls of the cylinder being insured by a resilient element within the chamber; the grease within the chamber being put under pressure by means of a resilient element without the chamber.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein the figure is a view in longitudinal section of a fragment of a cylinder of a recoil system with a floating piston constructed in accordance with my invention in place therein.

Referring to the drawing by numerals of reference:

The usual cylinder of a recoil system is indicated by the numeral 1 having an air end 2 and an oil end 3. Within the cylinder is mounted a stem 4, preferably formed with a squared portion 5 and terminating in a head 6 having a reduced portion encircled by the packing 7. Mounted for rectilinear sliding movement upon the squared portion 5 of the stem is a ring 8 which engages the packing 7 and the hub of which is formed with ribs 9 to hold a resilient element, such as the coiled spring 10 which surrounds the hub, in proper position. To protect the highly polished surface of the cylinder 1 from being marred by the spring 10 the spring may be surrounded by a sleeve 11. Also mounted for rectilinear sliding movement on the squared portion 5 is another ring 8 having a hub provided with ribs 9 and between these two rings the resilient element 10 is confined.

Mounted on the stem 4 is a cage 12 the reduced forward end of which is also encircled by a packing 7 and the cage is held against annular movement with respect to the rings 8 by suitable means, such as the pin 13 which projects through an aperture formed in the adjacent ring 8 and into a recess formed in the head of the cage 12. It will be understood the ring 8 adjacent the cage rests against the packing 7 which encircles the reduced portion of the head of the cage 12.

Within the cage is positioned a disc 14 formed with a hub which bears upon packing 15, which packing encircles the stem 4 and is positioned within a recess formed within the head of the cage. A resilient element, such as the coiled spring 16, is positioned within the cage and has one end abutting the disc 14 while the other end rests against a head 17 which is slidable in the other end of the cage. I provide means for moving the head 17 of the cage so as to tension the resilient element 16 such means, as herein shown, consisting of a nut 18 which is threaded on the threaded end of the stem 4 and which overlies the head 17. Between the cage and the cylinder 1 I prefer to place a metallic packing 19 to aid in sealing the piston against the passage of air.

I provide means for introducing grease into the grease chamber such as the port 20 closed normally by screw plug 21 which may rest upon a packing 22 to insure a tight joint. Ports 23—23 are provided in the rings 8 so that grease may pass freely to all portions of the chamber. A threaded recess 24 may be formed in the head 6 for the reception of a tool to aid in withdrawing the piston from the cylinder when desired.

I claim:

1. A floating piston, embodying a stem formed with a head, packing encircling the head, a ring mounted on the stem and free to move rectilinearly thereon, said ring engaging the packing, a second ring encircling the stem and free to move rectilinearly thereof, a resilient element between the rings, a cage mounted on the stem for rectilinear movement with respect thereto, a packing ring encircling the cage and contacting the second mentioned ring, a resilient element within the cage and means engaging the stem and cage for adjusting the tension of the resilient element to vary the pressure within the spaces between the two first mentioned rings and means for admitting grease under pressure to said space.

2. A floating piston, embodying a stem formed with a head, a packing encircling the head, a cage mounted for rectilinear movement on the stem, packing encircling the cage, spaced apart members mounted for rectilinear movement on the stem and engaging the respective packings, a resilient element interposed between said elements, means for admitting grease under pressure to the space between said elements, a resilient element in the cage and means for tensioning said resilient element to control the pressure within said grease space.

3. A floating piston, embodying a stem, packing associated with said stem, a grease chamber formed about said stem and between the packing and a resilient element connected to the stem outside of said grease chamber and means for tensioning the resilient element to control the pressure within the grease chamber.

BRYAN P. JOYCE.